United States Patent
Tsai

(10) Patent No.: US 6,170,751 B1
(45) Date of Patent: Jan. 9, 2001

(54) SCANNING MODULE WITH VARIABLE OPTICAL PATHS FOR GENERATING DIFFERENT SCANNING RESOLUTION

(75) Inventor: Chi-Pin Tsai, Hsinchu (TW)

(73) Assignee: Microtek International Inc., Hsin-Chu (TW)

( * ) Notice: Under 35 U.S.C. 154(b), the term of this patent shall be extended for 0 days.

(21) Appl. No.: 09/074,449

(22) Filed: May 6, 1998

(51) Int. Cl.[7] ........................................... G06K 7/10
(52) U.S. Cl. ........................ 235/472.01; 235/462.13
(58) Field of Search .................... 235/382, 380, 235/379, 462.01, 382.05, 475, 479, 462.2, 462.13, 462.11, 472.01; 358/471, 474, 498, 486; 250/235, 208.2

(56) References Cited

U.S. PATENT DOCUMENTS

| | | | | |
|---|---|---|---|---|
| 4,146,786 | * | 3/1979 | Agulnek | 250/235 |
| 4,536,077 | * | 8/1985 | Stoffel | 358/497 |
| 4,580,172 | * | 4/1986 | Rajagopal | 358/451 |
| 4,846,589 | * | 7/1989 | Chikuma et al. | 384/50 |
| 4,864,415 | * | 9/1989 | Beikirch et al. | 358/474 |
| 5,018,025 | * | 5/1991 | Herloski | 358/471 |
| 5,043,827 | * | 8/1991 | Beikirch | 358/471 |
| 5,188,032 | * | 2/1993 | Lewis et al. | 101/453 |
| 5,249,525 | * | 10/1993 | Lewis et al. | 101/453 |
| 5,272,979 | * | 12/1993 | Lewis et al. | 101/467 |
| 5,315,414 | * | 5/1994 | Beikirch et al. | 358/512 |
| 5,373,374 | * | 12/1994 | Traino et al. | 358/512 |
| 5,437,441 | * | 8/1995 | Tuhro et al. | 270/1.03 |
| 5,532,845 | * | 7/1996 | Gusmano | 358/474 |
| 5,579,115 | * | 11/1996 | Stein et al. | 358/296 |
| 5,604,608 | * | 2/1997 | Walsh et al. | 358/486 |
| 5,635,973 | * | 6/1997 | Yamada | 347/171 |
| 5,770,852 | * | 6/1998 | Rancourt et al. | 250/208.2 |
| 5,781,007 | * | 7/1998 | Partika et al. | 324/220 |
| 5,796,496 | * | 8/1998 | Ono | 358/498 |
| 5,907,413 | * | 5/1999 | Han | 358/497 |
| 5,912,458 | * | 6/1999 | Squires et al. | 250/234 |
| 5,939,728 | * | 8/1999 | Wachtel et al. | 250/586 |

* cited by examiner

Primary Examiner—Thien M. Le

(57) ABSTRACT

The present invention discloses a scanning module with variable optical paths for increasing scanning resolution. The scanning module comprises a carriage with a first scanning position, a light detecting device, a plurality of mirrors, and a lens set. The light detecting device is installed inside the carriage for detecting light transmitted from the document at the first scanning position. The plurality of mirrors is installed inside the carriage for reflecting the light from the document to the light detecting device. The plurality of mirrors comprises at least one moveable mirror for changing an optical path from the document to the light detecting device thereby allowing the light from the document be transmitted to the light detecting device along a first optical path or a second optical path. The lens set is installed inside the carriage with a first end and a second end for focusing the light from the document onto the light detecting device. In the first optical path, the light from the document will be transmitted to the first end of the lens set and focused by the lens set onto the light detecting device. In the second optical path, the light from the document will be transmitted to the second end of the lens set and focused by the lens set onto the light detecting device.

7 Claims, 4 Drawing Sheets

SCANNING MODULE WITH VARIABLE OPTICAL PATHS FOR GENERATING DIFFERENT SCANNING RESOLUTION

BACKGROUND OF THE INVENTION

1. Field of the Invention

The present invention relates to a scanning module of an optical scanner, and more particularly, to a scanning module with variable optical paths for increasing scanning resolution.

2. Description of the Prior Art

Prior art optical scanners such as flatbed scanners or sheet-fed scanners usually comprise a scanning module with a fixed optical path along which an image of a document is focused by a lens onto a light detecting device within the scanning module for scanning the document. The use of such a scanning module is adequate for scanning text documents, but if the scanning module is used for scanning documents containing graphics, images or color films, the resolution of the scanning module in the prior art scanning module is insufficient and cannot be easily increased because the optical path is fixed.

SUMMARY OF THE INVENTION

It is therefore a primary objective of the present invention to provide a scanning module to solve the above mentioned problems.

In a preferred embodiment, the present invention provides a scanning module of a scanner comprising:

a carriage with a first scanning position;

a light detecting device installed inside the carriage for detecting light from a document which is transmitted from the first scanning position;

a plurality of mirrors installed inside the carriage for reflecting the light from the document to the light detecting device, the plurality of mirrors comprising at least one moveable first mirror for changing the optical path of the light from the document to the light detecting device so that the light from the document can be directed to the light detecting device along a first optical path or a second optical path; and a lens set installed inside the carriage for focusing the light from the document onto the light detecting device, the lens set comprising a first end and a second end;

wherein in the first optical path, the light from the document is directed through the lens set from the first end to the second end of the lens set and then focused by the lens set onto the light detecting device, and in the second optical path, the light from the document is transmitted through the lens set from the second end to the first end of the lens set and then focused by the lens set onto the light detecting device.

It is an advantage of the present invention that the resolution of the scanning module can be easily increased by rotating the moveable mirror.

It is another advantage of the present invention that the light detecting device and lens set are currently available components, thus the scanning module can be manufactured easily and inexpensively.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
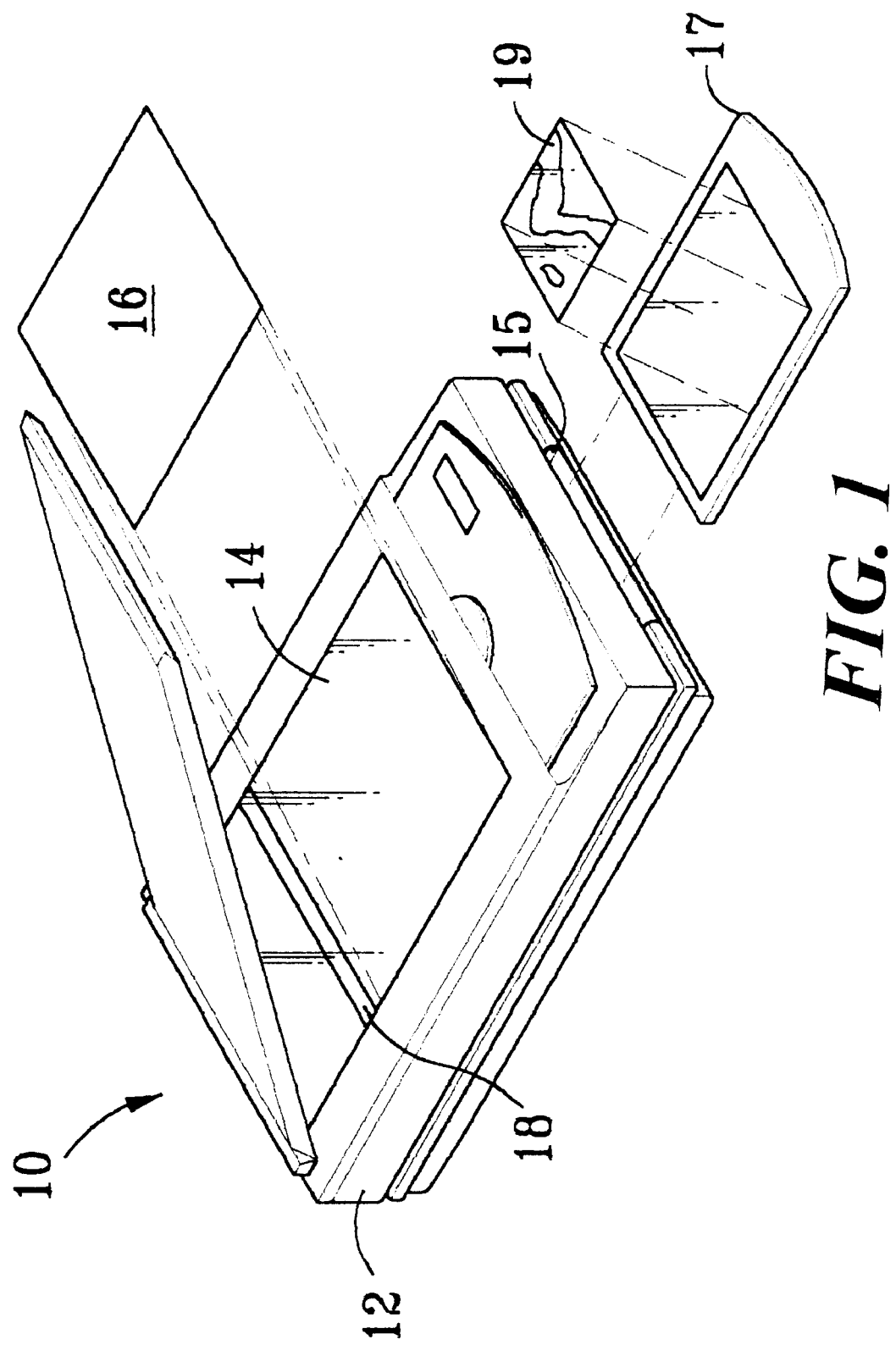
FIG. 1 is a perspective view of a scanner according to the present invention.

Please refer to FIG. 1. FIG. 1 is a perspective view of a scanner 10 according to the present invention. The scanner 10 comprises a housing 12, a transparent platform 14 installed on top of the housing 12 for placing a document 16 to be scanned, a film panel 17 for placing a film 19 to be scanned, an insertion slot 15 installed at the front of the housing 12 for feeding the film panel 17 and the film 19 on its top, and a scanning module 18 for scanning the document 16 placed on the transparent platform 14 or the film 19 placed on the film panel 17.

Figure 2:
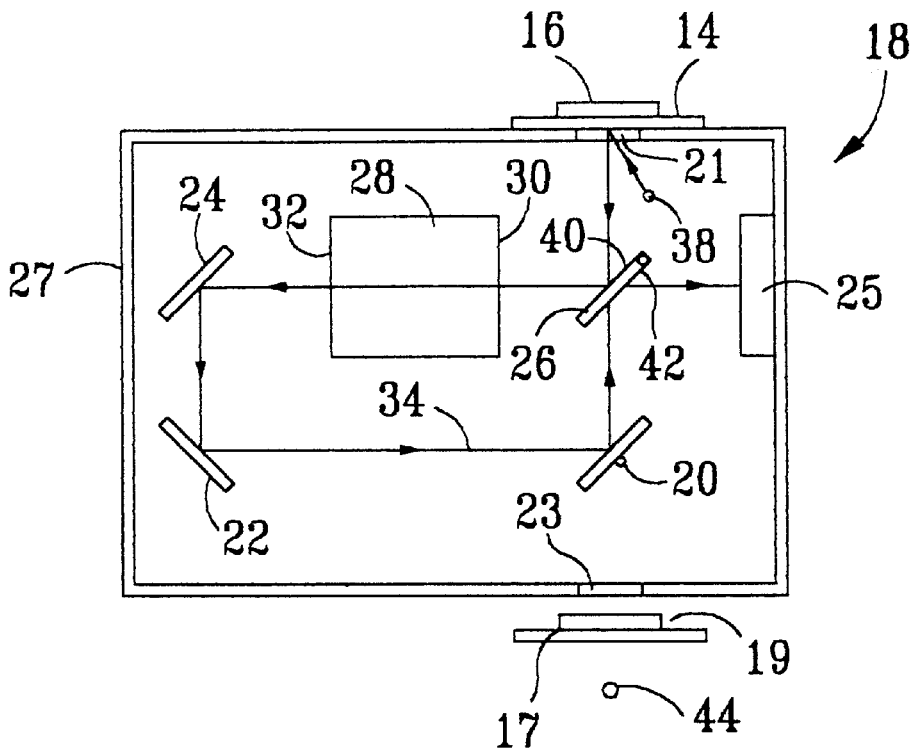
FIGS. 2 to 4 show three different optical paths of the scanning module shown in FIG. 1.
Figure 3:
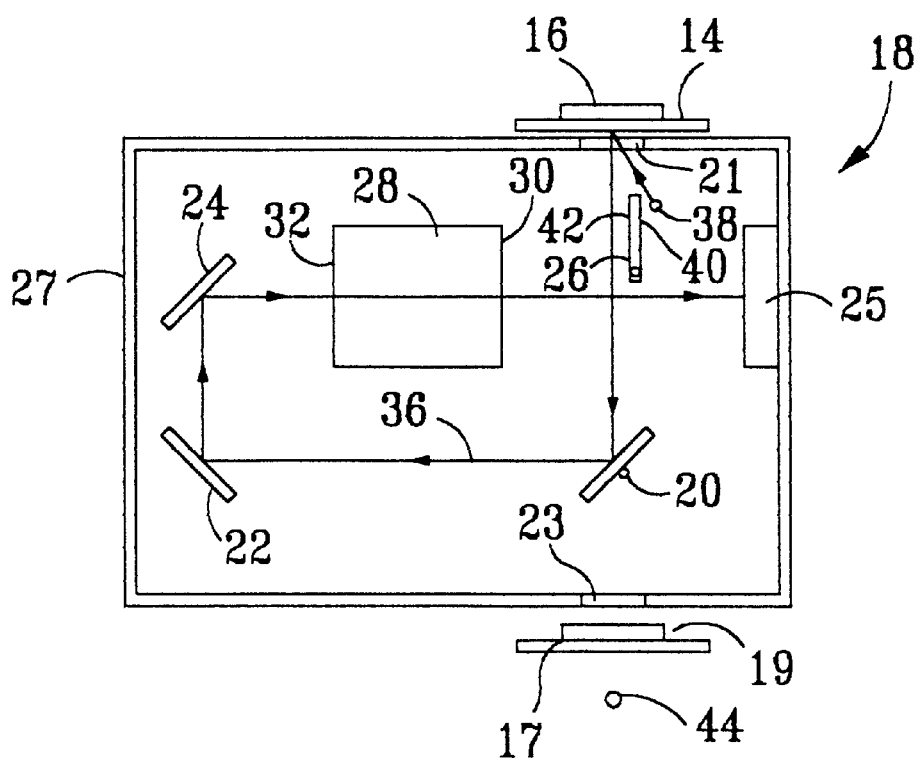
Figure 4:
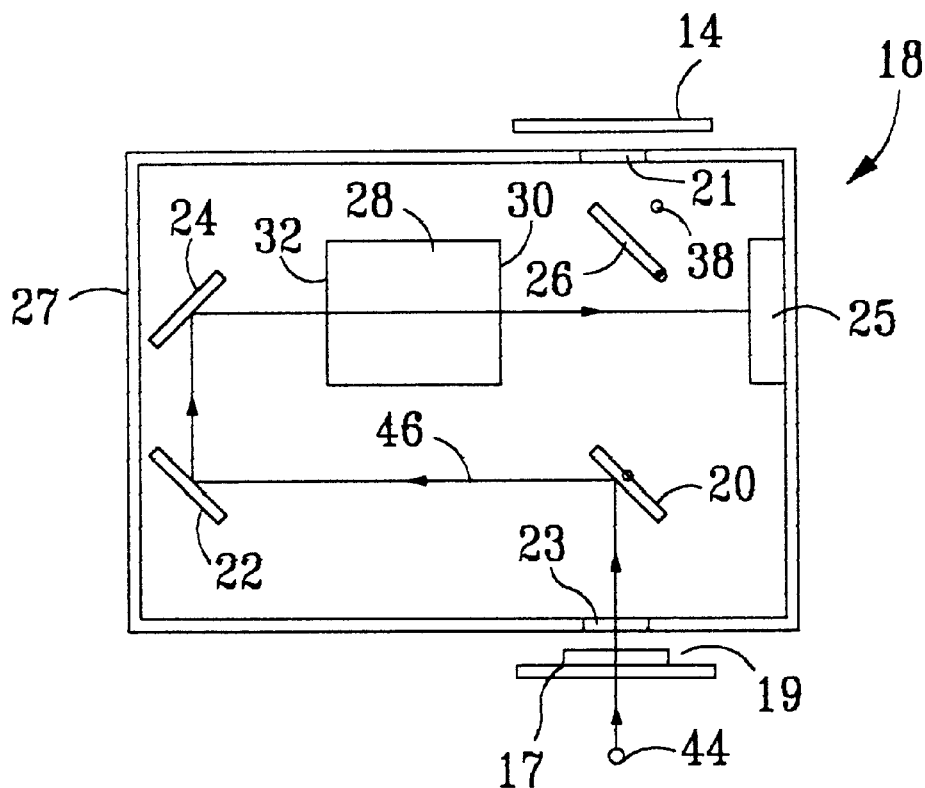

Please refer to FIGS. 2 to 4 which display a first optical path 34, second optical path 36, and third optical path 46 of the scanning module 18 respectively. The scanning module 18 comprises a carriage 27 having a top opening 21 for scanning the document 16 placed on the transparent platform 14 on its top side, and a bottom opening 23 for scanning the film 19 placed on the film panel 17. The scanning module 18 further comprises a top light source 38 for emitting light toward the document 16 thereby generating reflected light for scanning the document 16, a bottom light source 44 for emitting light toward the film 19 thereby generating transmitted light for scanning the film 19, a light detecting device 25 installed inside the carriage 27 for detecting the light reflected from the document 16 through the top opening 21 or the light transmitted through the film 19 and the bottom opening 23, a moveable double-sided mirror 26, two fixed mirrors 22, 24, a moveable single-sided mirror 20, a lens set 28 with a first end 30 and a second end 32 for focusing the light transmitted from the document 16 or the film 19 onto the light detecting device 25, and a driving device (not shown) for driving the moveable double-sided mirror 26 and the single-sided mirror 20 independently. The driving device is disclosed in U.S. Pat. No. 5,574,274.

Scanning the document 16 can be done by following the first optical path 34 shown in FIG. 2 or the second optical path 36 shown in FIG. 3. The first optical path 34 and the second optical path 36 differ in the position of the moveable double-sided mirror 26. The position of the moveable single-sided mirror 20 is fixed over the two optical paths 34, 36. FIG. 2 shows that in the first optical path 34, the light reflected from the document 16 will be reflected by a first side 40 of the double-sided mirror 26 to the first end 30 of the lens set 28, and then focused by the lens set 28 and reflected by the fixed mirrors 24, 22, single-sided mirror 20, and a second side 42 of the double-sided mirror 26 to the light detecting device 25. FIG. 3 shows that in the second optical path 36, the double-sided mirror 26 is rotated away from the second optical path 36 thereby causing the light reflected from the document 16 to be transmitted to the second end 32 of the lens set 28 along the single-sided mirror 20 and the fixed mirrors 22, 24, and then directly focused by the lens set 28 onto the light detecting device 25.

In the first optical path 34, an object distance of the lens set 28 is a distance along the optical path 34 from the transparent platform 14 to the first end 30 of the lens set 28, and an image distance is a distance along the optical path 34 from the second end 32 of the lens set 28 to the light detecting device 25. In the second optical path 36, an object distance of the lens set 28 is a distance of the optical path 36 from the transparent platform 14 to the second end 32 of the lens set 28, and an image distance is a distance from the first end 30 of the lens set 28 to the light detecting device 25. Because ratios of object distance to image distance of the first and second optical paths 34, 36 are different, these optical paths 34, 36 have different resolutions. Furthermore, the first optical path 34 can generate a high resolution but can only scan a small area whereas the second optical path 36 can scan a large area but can only generate a low resolution.

FIG. 4 shows that in the third optical path 46, the double-sided mirror 26 is rotated away from the optical path 46, and the single-sided mirror 20 is rotated to another position so that the light transmitted from the film 19 can be transmitted along the fixed mirrors 22, 24 to the second end 32 of the lens set 28, and then focused by the lens set 28 onto the light detecting device 25.

Figure 5:
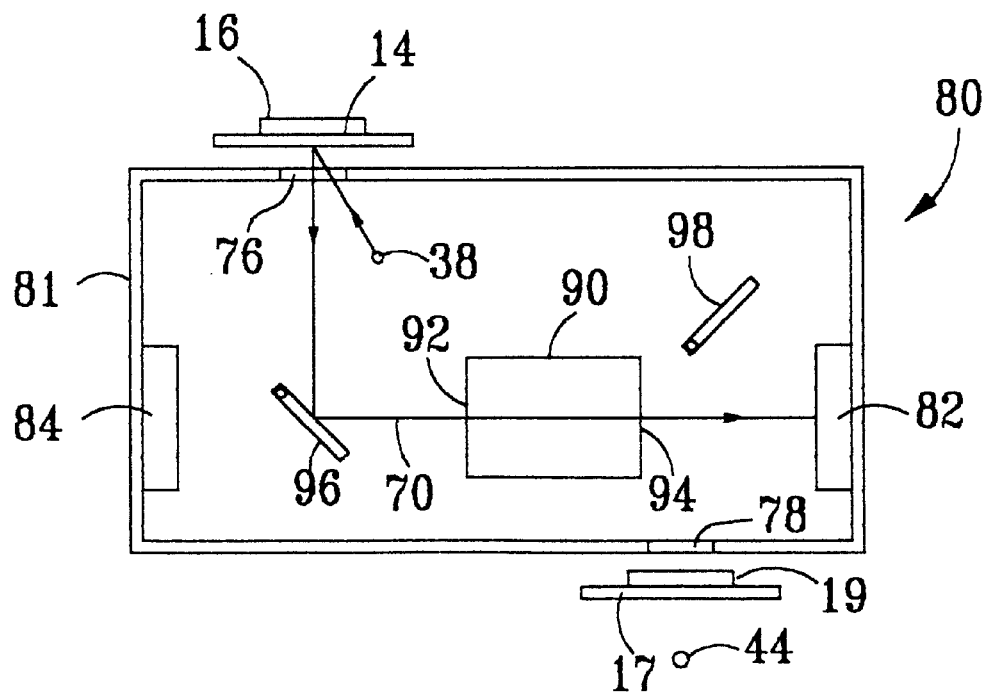
FIG. 5 shows an optical path of an alternative scanning module of the scanner in FIG. 1.
Figure 6:
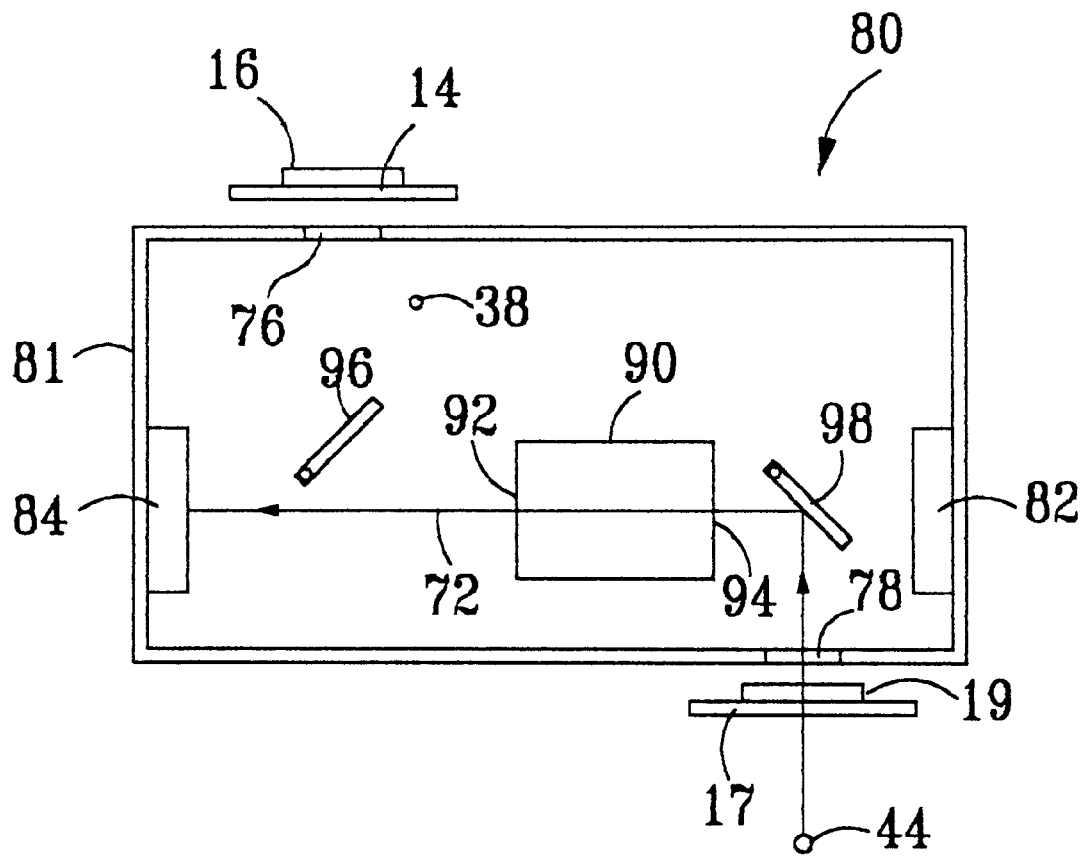
FIG. 6 shows another optical path of the scanning module in FIG. 5.

Please refer to FIG. 5 and FIG. 6. FIG. 5 shows an optical path 70 of an alternative scanning module 80 of the scanner 10 in FIG. 1. FIG. 6 shows another optical path 72 of the scanning module 80 in FIG. 5. The scanning module 80 comprises a carriage 81 having a top opening 76 installed on its top for scanning the document 16 placed on the transparent platform 14, and a bottom opening 78 installed on its bottom for scanning the film 19 placed on the film platform 17. The scanning module 80 further comprises a top light source 38 for emitting light to the document 16 for scanning the document 16, a bottom light source 44 for emitting light to the film 19 for scanning the film 19, a first light detecting device 82 installed inside the carriage 81 for detecting the light transmitted from the document 16 through the top opening 76, a second light detecting device 84 installed inside the carriage 81 for detecting the light transmitted from the film 19 through the bottom opening 78, two moveable single-sided mirrors 96, 98, a lens set 90 with a first end 92 and a second end 94 for focusing the light transmitted from the document 16 or film 19 on the first light detecting device 82 or the second light detecting device 84, and a driving device (not shown) for separately driving the moveable single-sided mirrors 96, 98.

In the first optical path 70 shown in FIG. 5, the single-sided mirror 98 is rotated away from the optical path 70, and the light transmitted from the document 16 is reflected by the single-sided mirror 96 to the first end 92 of the lens set 90, and then directly focused by the lens set 90 onto the first light detecting device 82. In the second optical path 72 shown in FIG. 6, the single-sided mirror 96 is rotated away from the optical path 72, and the light transmitted from the film 19 is reflected by the single-sided mirror 98 to the second end 94 of the lens set 90, and then directly focused by the lens set 90 onto the second light detecting device 84. Because the film 19 requires a higher resolution than a standard document 16, the lens set 90 is positioned closer to the first light detecting device 82 and farther away from the second light detecting device 84, and the top opening 76 and the single-sided mirror 96 are installed closer to the second light detecting device 84. Such an arrangement will make a ratio of an image distance to an object distance of the first optical path 70 less than the second optical path 72 thereby generating a higher resolution for the second optical path 72.

The resolutions of the scanning modules 18, 80 can be changed easily by selectively rotating the moveable mirrors. The light detecting devices and lens sets are all currently available components, thus the scanning modules 18, 80 can be manufactured easily and inexpensively.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanning module of a scanner comprising:
   a carriage with a first scanning position;
   a light detecting device installed inside the carriage for detecting light from a document which is transmitted from the first scanning position;
   a plurality of mirrors installed inside the carriage for reflecting the light from the document to the light detecting device, the plurality of mirrors comprising at least one moveable first mirror for changing the optical path of the light from the document to the light detecting device so that the light from the document can be directed to the light detecting device along a first optical path or a second optical path; and
   a lens set installed inside the carriage for focusing the light from the document onto the light detecting device, the lens set comprising a first end and a second end;
   wherein in the first optical path, the light from the document is directed through the lens set from the first end to the second end of the lens set and then focused by the lens set onto the light detecting device, and in the second optical path, the light from the document is transmitted through the lens set from the second end to the first end of the lens set and then focused by the lens set onto the light detecting device.

2. The scanning module of claim 1 further comprising a light source for emitting light to the document.

3. The scanning module of claim 1 further comprising a driving device for driving the first mirror so that the light transmitted from the document can be directed to the light detecting device through the first optical path or the second optical path.

4. The scanning module of claim 1 wherein a distance from the lens set to the light detecting device in the first optical path is different from that of the second optical path so that the light detecting device will generate different resolutions when scanning the document.

5. The scanning module of claim 1 wherein the first mirror is a double-sided mirror installed between the lens set and the light detecting device and wherein in the first optical path, a front side of the double-sided mirror reflects the light from the document to the first end of the lens set, and a rear side of the double-sided mirror reflects the light transmitted along other mirrors to the light detecting device, and in the second optical path, the double-sided mirror is moved away from the second optical path causing the light from the document reflected by the other mirrors to the second end of the lens set, and then transmitted through the lens set to the light detecting device.

6. The scanning module of claim 5 wherein the carriage further comprises a second scanning position, the plurality of mirrors along the second optical path further comprises a moveable second mirror which can be switched to another position so that light from a second document which is transmitted from the second scanning position can be reflected by the second mirror and other mirrors along the second optical path to the light detecting device.

7. A scanning module comprising:
   a carriage with a first scanning position and a second scanning position;
   a first light detecting device installed inside the carriage for detecting light transmitted from a first document at the first scanning position;

a second light detecting device installed inside the carriage for detecting light transmitted from a second document at the second scanning position;

a lens set installed between the first and second light detecting devices with a first end and a second end;

a moveable first mirror installed inside the carriage for reflecting the light transmitted from the first document through the lens set from the first end to the second end of the lens set and focused by the lens set onto the first light detecting device;

a moveable second mirror installed inside the carriage for reflecting the light transmitted from the second document through the lens set from the second end to the first end of the lens set and focused by the lens set onto the second light detecting device;

wherein when the light from the first document is transmitted to the first light detecting device, the second mirror will be moved away for allowing the light to pass through, and when the light from the second document is transmitted to the second light detecting device, the first mirror will be moved away for allowing the light to pass through.

* * * * *